(No Model.)

E. PECKHAM.
VEHICLE MOTOR GEAR.

No. 417,938. Patented Dec. 24, 1889.

Witnesses:
W. E. Bowen
W. L. Murray

Inventor:
Edgar Peckham,
By J. E. W. Bowen
Attorney.

UNITED STATES PATENT OFFICE.

EDGAR PECKHAM, OF NEW YORK, N. Y.

VEHICLE MOTOR-GEAR.

SPECIFICATION forming part of Letters Patent No. 417,938, dated December 24, 1889.

Application filed August 21, 1889. Serial No. 321,455. (No model.)

*To all whom it may concern:*

Be it known that I, EDGAR PECKHAM, a citizen of the United States, and a resident of New York, in the county of New York and State of New York, have invented certain new and useful Improvements in Electric-Motor Trucks and Gears, of which the following is a specification.

My invention has reference to the gear by means of which an electric motor is operatively connected with the axles of the drive-wheels of the truck upon which the motor is mounted.

The object of the invention is to simplify the gear, reduce its cost, and so dispose the several elements which enter into the construction as to obtain more satisfactory results than can be secured by the organizations now in use.

As commonly arranged the armature-shaft is supported in the side frame of the truck, at one of its ends only, while its opposite unsupported end is in gear with the counter-shaft, the opposite end of the latter being in gear with the axle of the drive-wheels. By my construction, wherein both ends of the armature-shaft are provided with bearings in the truck-frame and said shaft is geared to the counter-shaft at each side of the suspended motor, I secure a more stable construction and one less liable to derangement by the vibrations of the motor and truck. Moreover, by gearing the counter-shaft to the axle of the drive-wheels centrally, or midway between the side frames of the truck, instead of connecting the counter-shaft to said axle at one end only, the regularity of the movements of the parts is further insured.

My invention also contemplates jointing the side bars of the truck-frame, said joint being arranged at any desirable point within the length of the bar, and being of such construction as will secure sufficient flexibility to relieve the truck and its gearing of unusual strain in rounding curves.

My improvements will now be described in connection with the accompanying drawings, and the novel features and combinations for which protection by Letters Patent is desired will be specified in the claims at the end hereof.

Figure 1:
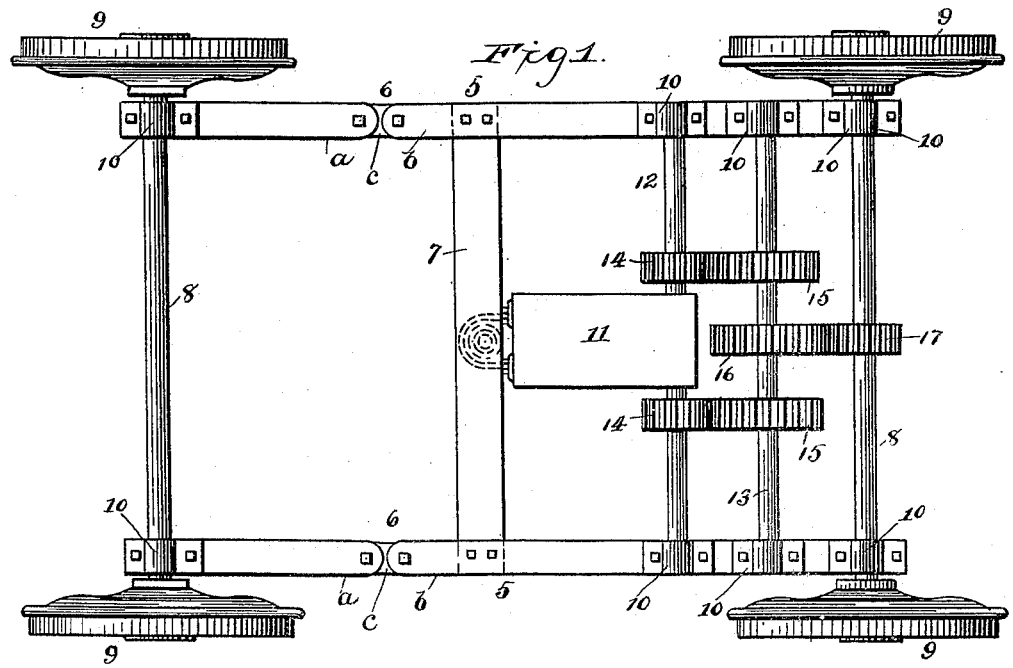
Figure 4:
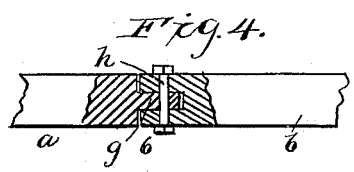
Figure 2:
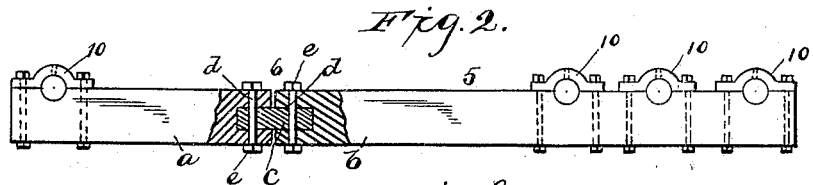
Figure 3:
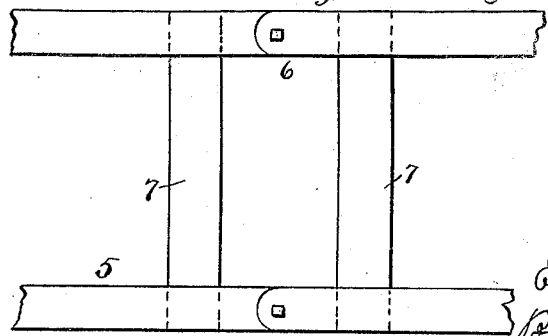

In the drawings forming a part of this specification, and wherein like parts are indicated by like figures of reference in the several views, Figure 1 is a top plan view of a truck provided with a motor-gearing embodying my invention; Fig. 2, a side elevation of one of the side bars of the truck, partly in section in order to show the construction of the flexible joint; Fig. 3, a plan view of a part of a truck-frame intended to support two motors, the flexible joint in this instance being located between the cross-beams which support the front of the motor, and Fig. 4 a detail showing a modified form of flexible joint.

Referring to the drawings, 5 indicates the two longitudinal rails of the truck-frame, each of which rails at some point of its length being provided with a joint 6, whereby the truck and its gear are relieved of strain in rounding curves, the said joints 6 giving to the bars 5 a flexibility that enables them to more readily adapt themselves to the conditions of the roadway. The joint 6 may be made as shown in Fig. 2 or as in Fig. 4. In the first-mentioned view the ends of the two sections of the bar 5 (marked $a$ and $b$) are semicircular or rounding where they approach each other at the joint, and they are provided with the central longitudinal openings shown, within which is fitted the solid metallic piece $c$, forming a link between the sections $a\ b$, as seen in the drawings. The piece $c$ is secured to the sections $a\ b$ by means of bolts $d$ held by nuts $e$, as shown. The exact location of the joint—or, in other words, the relative lengths of the rail-sections $a\ b$—is not material; but in a truck adapted for a single motor said joint will preferably be arranged near the cross-beam 7, which supports the front end of the motor, as illustrated in Fig. 1. One of the advantages of this joint is, that it relieves the truck of the rigidity which it otherwise would have owing to its length. Where the truck is intended to carry a pair of motors, the joint 6 will by preference be placed in the center of the length of the bars 5, or between the cross-beams 7, as seen in Fig. 3. The joint 6 (shown in Fig. 4) comprises an opening in one of the bar-sections $b$ and a tongue $g$ on the other bar-section $a$. The tongue $g$ is not made quite as long as the depth of the opening in which it operates, so that the joint may not bind in operation. The tongue g is held in its opening by means of bolt h, as shown.

The axles 8 of the truck, to which the drive-wheels 9 are secured, revolve in bearings 10, of the usual construction, mounted in proper position on the side bars 5.

The motor is indicated by 11 and is supported at its front on the cross-beam 7 in the usual way. The armature-shaft 12 and counter-shaft 13 are also supported in bearings on the side bars 5 in the same manner as the axles 3 are supported, both of these shafts, it will be seen, extending clean across the truck-frame and having both of their ends directly supported by said side bars. At each side of the motor the armature-shaft is provided with suitable gear-wheels 14, fixed to the shaft, and meshing with gear-wheels 15, fixed relatively opposite on the counter-shaft 13. The motion of the armature-shaft is thus transmitted to the counter-shaft in a very effective manner. In the center of the counter-shaft 13, midway between the two gear-wheels 15, there is fixed a gear-wheel 16, of the proper size, which meshing with the gear-wheel 17, secured to the axle 8, the said axle is thereby caused to revolve and thus propel the truck.

Having thus described my invention, what I claim as new, and desire to secure by Letters Patent, is—

1. An electric-motor truck comprising a frame composed of two sections, each supported on one of the axles of the truck, and a flexible coupling connecting said frame-sections together, in combination with the motor mounted on the frame and supported at its front end on a transverse bar secured to one of said frame-sections, substantially as set forth.

2. In an electric-motor truck, a pair of side bars supported by the axles of the drive-wheels, each of said bars consisting of two sections, the contiguous ends of which are rounding, as shown, and provided with longitudinal openings, and held in operative relation to each other by metallic pieces, as c, bolted within said openings, substantially as set forth.

3. In an electric-motor truck, a pair of flexibly-jointed side bars supported by the axles of the drive-wheels, in combination with a motor and its gearing supported on said side bars, and a cross-beam sustaining the front of said motor, and likewise supported on said side bars, substantially as set forth.

4. In a motor-gear, a pair of side bars supported by the axles of the drive-wheels, in combination with a motor and its armature-shaft, the latter supported at both ends in bearings on said side bars, a counter-shaft similarly supported and geared to the armature-shaft at both sides of the motor, and gearing between the counter-shaft and driven axle arranged midway between the gearing connecting armature and counter shafts, substantially as and for the purpose set forth.

5. In a motor-gear, a pair of flexibly-jointed side bars, axles carrying drive-wheels and supported by said bars, and cross-beam likewise supported on the side bars, in combination with a motor sustained at its front on said cross-beam, armature and counter shafts supported at both of their ends in bearings on the side bars, and gearing for transmitting the motion of the armature-shaft to propel the axle of the drive-wheels, substantially as set forth.

Signed at New York, in the county of New York and State of New York, this 17th day of August, A. D. 1889.

EDGAR PECKHAM.

Witnesses:
J. E. M. BOWEN,
W. E. BOWEN.